(12) United States Patent
Hsueh

(10) Patent No.: US 10,334,671 B1
(45) Date of Patent: Jun. 25, 2019

(54) BACKLIGHT DEVICE AND DIMMING CONTROL METHOD THEREOF

(71) Applicant: ANPEC ELECTRONICS CORPORATION, Hsinchu (TW)

(72) Inventor: Wei-Chieh Hsueh, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/230,579

(22) Filed: Dec. 21, 2018

(30) Foreign Application Priority Data

Nov. 2, 2018 (TW) .............................. 107138990 A

(51) Int. Cl.
*H05B 33/08* (2006.01)

(52) U.S. Cl.
CPC ..... *H05B 33/0815* (2013.01); *H05B 33/0827* (2013.01)

(58) Field of Classification Search
CPC ............ H05B 33/0809; H05B 33/0827; H05B 33/0815; H05B 33/0842; H05B 33/0845; H05B 33/089; H05B 37/02; H05B 37/0281
See application file for complete search history.

(56) References Cited

U.S. PATENT DOCUMENTS

| | | | | |
|---|---|---|---|---|
| 8,581,828 B2 * | 11/2013 | Yang | .................... | G09G 3/3406 345/102 |
| 9,370,066 B2 * | 6/2016 | Han | .................... | H05B 33/0812 |
| 10,182,475 B2 * | 1/2019 | Kang | ................ | H05B 33/0815 |
| 2009/0302776 A1 * | 12/2009 | Szczeszynski | ..... | H05B 33/0815 315/246 |
| 2010/0148691 A1 * | 6/2010 | Kuo | .................... | H05B 33/0815 315/291 |
| 2013/0278166 A1 * | 10/2013 | Katoh | .................... | H03K 17/00 315/224 |
| 2014/0139126 A1 * | 5/2014 | Yang | .................... | G09G 3/3406 315/186 |

* cited by examiner

*Primary Examiner* — Tung X Le
*Assistant Examiner* — Borna Alaeddini
(74) *Attorney, Agent, or Firm* — Li & Cai Intellectual Property (USA) Office

(57) ABSTRACT

A backlight device and a dimming control method thereof are provided. The method includes the following steps: supplying power to a plurality of light strips and a plurality of first switch components; storing an initial pulse signal in a pulse storage circuit; determining whether or not a frequency of the initial pulse signal is smaller than a frequency threshold by a pulse modulation control circuit, and if yes, outputting a pulse width modulation control signal and a voltage adjusting control signal; adjusting a pulse width of the initial pulse signal according to the pulse width modulation control signal to output a pulse width modulation signal to each of the first switch components by a pulse generator circuit; and outputting a voltage adjusting signal to each of the first switch components according to an adjustment ratio of the initial pulse signal to the pulse width modulation signal.

12 Claims, 6 Drawing Sheets

BACKLIGHT DEVICE AND DIMMING CONTROL METHOD THEREOF

CROSS-REFERENCE TO RELATED PATENT APPLICATION

This application claims the benefit of priority to Taiwan Patent Application No. 107138990, filed on Nov. 2, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a backlight device, and in particular to a backlight device and a dimming control method thereof.

BACKGROUND OF THE DISCLOSURE

The liquid crystal display device has a larger size, a lighter weight and lower power consumption than that of the cathode ray tube (CRT). Therefore, the liquid crystal display device can be used for a television receiver or a variety of electronic devices. The liquid crystal display device encloses liquid crystal between two transparent substrates of variable sizes and applies electrical voltage across two electrodes provided to the transparent substrates to change orientations of liquid crystal molecules and light transmittance for optical display of, for example, a preset image.

In the liquid crystal display device, the liquid crystal itself does not emit light, and thus a light source needs to be configured for emitting light onto a liquid crystal panel. The light source may be a side light system in which light is emitted from a lateral side of a back surface of the liquid crystal panel, or a backlight system in which light is emitted directly from a back side of the liquid crystal panel. The liquid crystal display device includes backlight units such as a light guide plate, a reflective sheet, a lens sheet or a light diffusing sheet, which are configured for guiding the light provided by the light source onto an entire surface of the liquid crystal panel from the back side of the liquid crystal panel.

SUMMARY OF THE DISCLOSURE

In response to the above-referenced technical inadequacies, the present disclosure provides a backlight device includes a plurality of light strips, a plurality of first switch components, a pulse storage circuit, a pulse generator circuit, a voltage adjuster circuit and a pulse modulation control circuit. The light strips are connected in parallel with each other and configured to receive supplied power. Each of the light strips includes one or more light-emitting components connected in series with each other. Each of the first switch components has a first terminal, a second terminal and a first control terminal. Each of the first switch components is configured to receive the supplied power. The first control terminals of the first switch components are connected to the light strips respectively, and the second terminal of each of the first switch components is grounded through a resistor. The pulse storage circuit is configured to store an initial pulse signal. The pulse generator circuit is connected to the first control terminals of the first switch components and configured to output a pulse width modulation signal to each of the first switch components. The voltage adjuster circuit is connected to the first control terminals of the first switch components and configured to output a voltage adjusting signal to each of the first switch components. The pulse modulation control circuit is connected to the pulse storage circuit, the pulse generator circuit and the voltage adjuster circuit. When the pulse modulation control circuit determines that a frequency of the initial pulse signal is smaller than a frequency threshold in a pulse frequency modulation mode, the pulse modulation control circuit outputs a pulse width modulation control signal for controlling the pulse generator circuit to increase a pulse width of the initial pulse signal to output the pulse width modulation signal having a frequency that is larger than the frequency threshold based on a ratio of the frequency of the initial pulse signal to the frequency threshold. The pulse modulation control circuit outputs a voltage adjusting control signal to control the voltage adjuster circuit to output the voltage adjusting signal for reducing a voltage across the first control terminal and the second terminal of each of the first switch components based on a ratio that is the same as an adjustment ratio of the initial pulse signal to the pulse width modulation signal.

In addition, the present disclosure provides a dimming control method for a backlight device, including the following steps: supplying power to light strips and first switch components by a power supply device; generating a voltage across a first control terminal of each of first switch components and the second terminal of each of the first switch components; setting an initial pulse signal and storing it in a pulse storage circuit; determining whether or not a frequency of the initial pulse signal is smaller than a frequency threshold in a pulse frequency modulation mode by a pulse modulation control circuit, and in response to the initial pulse signal being not smaller than the frequency threshold, outputting a pulse control signal and a voltage control signal, and in response to the initial pulse signal being smaller than the frequency threshold, outputting a pulse width modulation control signal and a voltage adjusting control signal based on a ratio of the frequency of the initial pulse signal to the frequency threshold; outputting, by a pulse generator circuit, the initial pulse signal of the pulse storage circuit according to the received pulse control signal, or increasing a pulse width of the initial pulse signal according to the received pulse width modulation control signal to output a pulse width modulation signal having a frequency that is larger than the frequency threshold; outputting, by a voltage adjuster circuit, an initial voltage signal according to the received voltage control signal, or outputting a voltage adjusting signal for reducing a voltage across the first control terminal and the second terminal of each of the first switch components based on a ratio that is the same as an adjustment ratio of the initial pulse signal to the pulse width modulation signal; and controlling each of the first switch components to operate by the initial pulse signal and the voltage control signal which are outputted to each of the first switch components, or controlling each of the first switch components to operate by the pulse width modulation signal and the voltage adjusting control signal which are outputted to each of the first switch components.

As described above, the present disclosure provides the backlight device and the dimming control method thereof, which can prevent the pulse signal from having too low a frequency in the backlight device. Therefore, the internal circuit components of the backlight device do not generate the noise when the backlight device displays the images. In addition, the backlight device can display the images having the lower grayscale than that of a conventional backlight device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
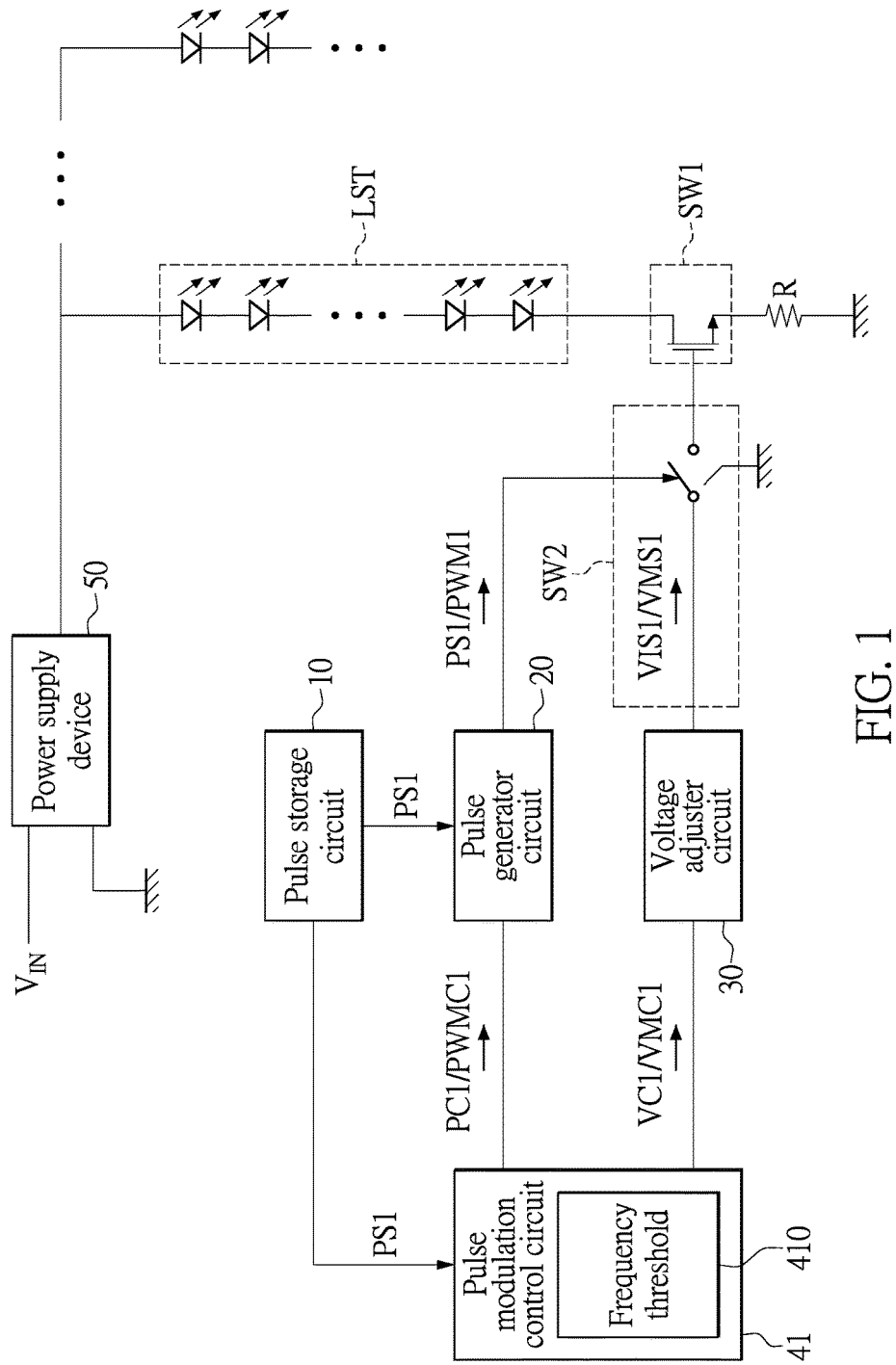
FIG. 1 is a circuit layout diagram of a backlight device in a pulse frequency modulation mode according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit layout diagram of a backlight device in a pulse frequency modulation mode according to a first embodiment of the present disclosure. As shown in FIG. 1, in the embodiment, the backlight device includes a plurality of light strips LST, a plurality of first switch components SW1 and a plurality of second switch components SW2. In addition, the backlight device of the embodiment includes a pulse storage circuit 10, a pulse generator circuit 20, a voltage adjuster circuit 30, a pulse modulation control circuit 41 and a power supply device 50, which are configured to control operations of the light strips LST and the switch components SW1 and SW2.

The light strips LST are connected in parallel with each other. Each of the light strips LST may include one or more light-emitting components such as light-emitting diodes, which are connected in series with each other, but the present disclosure is not limited thereto. A positive terminal of the light strip LST is connected to the power supply device 50 to receive a supplied power. A negative terminal of the light strip LST is connected to the corresponding first switch component SW1.

The first switch component SW1 has a first terminal, a second terminal and a first control terminal. In the embodiment, the first switch component SW1 is an NMOS transistor, which has a drain terminal, a source terminal and a gate terminal, but the present disclosure is not limited thereto. In practice, the NMOS transistor may be replaced with a PMOS transistor or other switch components. A first terminal such as the drain terminal of the first switch component SW1 is connected to the power supply device 50 through the light strip LST to receive supplied power from the power supply device 50. A second terminal such as the source terminal of the first switch component SW1 is grounded through a resistor R.

Each of the light strips LST is connected to the pulse generator circuit 20 and the voltage adjuster circuit 30 through the first switch component SW1. More specifically, the first control terminal such as the gate terminal of the first switch component SW1 is connected to an output terminal of the voltage adjuster circuit 30 and an output terminal of the pulse generator circuit 20. The pulse modulation control circuit 41 is connected to the pulse storage circuit 10, the pulse generator circuit 20 and the voltage adjuster circuit 30. The pulse storage circuit 10 is connected to the pulse generator circuit 20.

Optionally, the second switch component SW2 is disposed between the voltage adjuster circuit 30 and each of the first switch components SW1, and between the pulse generator circuit 20 and each of the first switch components SW1. The second switch component SW2 has a third terminal, a fourth terminal and a second control terminal. The second control terminal of the second switch component SW2 is connected to the pulse generator circuit 20. The third terminal of the second switch component SW2 is connected to the voltage adjuster circuit 30.

The pulse storage circuit 10 may receive a preset initial pulse signal PS1 from the other circuit components included in the backlight device or external electronic components and store the preset initial pulse signal PS1. The pulse modulation control circuit 41 may obtains and stores a frequency threshold 410. In the pulse frequency modulation mode, the pulse modulation control circuit 41 may obtain the initial pulse signal PS1 from the pulse storage circuit 10 and compare a frequency of the initial pulse signal PS1 with the frequency threshold 410.

When the pulse modulation control circuit 41 determines that the frequency of the initial pulse signal PS1 is larger than the frequency threshold 410, it is determined that internal circuit components such as a capacitor in the backlight device using the initial pulse signal PS1 will not generate noise. In this case, the pulse modulation control circuit 41 may output a pulse control signal PC1 to the pulse generator circuit 20 and a voltage control signal VC1 to the voltage adjuster circuit 30.

The pulse generator circuit 20 may output the preset initial pulse signal PS1 directly to the first switch component SW1 through the second switch component SW2, according to the pulse control signal PC1 from the pulse modulation control circuit 41. The voltage adjuster circuit 30 may output an initial voltage signal VIS1 to the first switch component SW1 through the second switch component SW2, according to the voltage control signal VC1 from the pulse modulation control circuit 41.

Conversely, the pulse modulation control circuit 41 determines that the frequency of the initial pulse signal PS1 is smaller than the frequency threshold 410, it is determined that the internal circuit components such as the capacitor in the backlight device using the initial pulse signal PS1 will generate noise that can be heard by human ears. For example, a noise frequency may be about 20 kHz or less, and the frequency threshold 410 may be set to 20 kHz, but the present disclosure is not limited thereto.

In the condition, the pulse modulation control circuit 41 outputs a pulse width modulation control signal PWMC1 for controlling the pulse generator circuit 20 to increase a pulse width of the initial pulse signal PS1 to output a pulse width modulation signal PWM1 having a frequency that is larger than the frequency threshold 410, according to a ratio of the frequency of the initial pulse signal PS1 to the frequency threshold 410. The backlight device using the pulse width modulation signal PWM1 does not generate noise.

The pulse modulation control circuit 41 outputs a voltage adjusting control signal VMC1 to the voltage adjuster circuit 30. The voltage adjuster circuit 30 outputs a voltage adjusting signal VMS1 to the first switch component SW1 to reduce a voltage across the first control terminal of the first switch component SW1 and the second terminal of the first switch component SW1, based on a ratio that is the same as an adjustment ratio of the initial pulse signal PS1 to the pulse width modulation signal PWM1, with respect to the initial voltage signal VIS1.

For example, when a level of a pulse wave of the initial pulse signal PS1 or the pulse width modulation signal PWM1 does not reach a reference level such as a low level, the fourth terminal of the second switch component SW2 is grounded. Under this condition, no signal is allowed to be transmitted to the first switch component SW1 through the second switch component SW2.

When a level of a pulse wave of the initial pulse signal PS1 or the pulse width modulation signal PWM1 reaches the reference level such as a high level, the fourth terminal of the second switch component SW2 is switched to be connected to the first control terminal of the first switch component SW1 by the initial pulse signal PS1 or the pulse width modulation signal PWM1. As a result, the initial pulse signal PS1 or the pulse width modulation signal PWM1 and the initial voltage signal VIS1 or the voltage adjusting signal VMS1 are allowed to be transmitted to the first control terminal of the first switch component SW1 through the second switch component SW2.

In detail, the initial pulse signal PS1 outputted by the pulse generator circuit 20 and the initial voltage signal VIS1 outputted by the voltage adjuster circuit 30 may be transmitted to the first switch component SW1 at the same time to form an initial control signal for controlling the first switch component SW1. Therefore, before the initial pulse signal PS1 and the initial voltage signal VIS1 are outputted to the first switch component SW1, the pulse modulation control circuit 41 calculates a frequency of the initial control signal including the initial pulse signal PS1 and the initial voltage signal VIS1 based on a duty cycle of the initial pulse signal PS1 and a voltage of the initial voltage signal VIS1, and determines whether the frequency of the initial control signal is smaller than the frequency threshold 410 to determine whether the initial control signal will cause the backlight device to generate the noise.

It is worth noting that the pulse width of the pulse width modulation signal PWM1 is increased and the voltage of the voltage adjusting signal VMS1 is reduced based on the same ratio. Light emission states such as lighting times, flicker frequencies and brightness of the light strips LST in the backlight device are controlled, according to the pulse width modulation signal PWM1 and the voltage adjusting signal VMS1. An image effect produced by the backlight device using the pulse width modulation signal PWM1 and the voltage adjusting signal VMS1 is substantially the same as an image effect produced by the backlight device using the initial pulse signal PS1 and the initial voltage signal VIS1 for human eyes. Therefore, in the embodiment, a noise problem of the backlight device can be solved without affecting the desired image effect.

Figure 2:
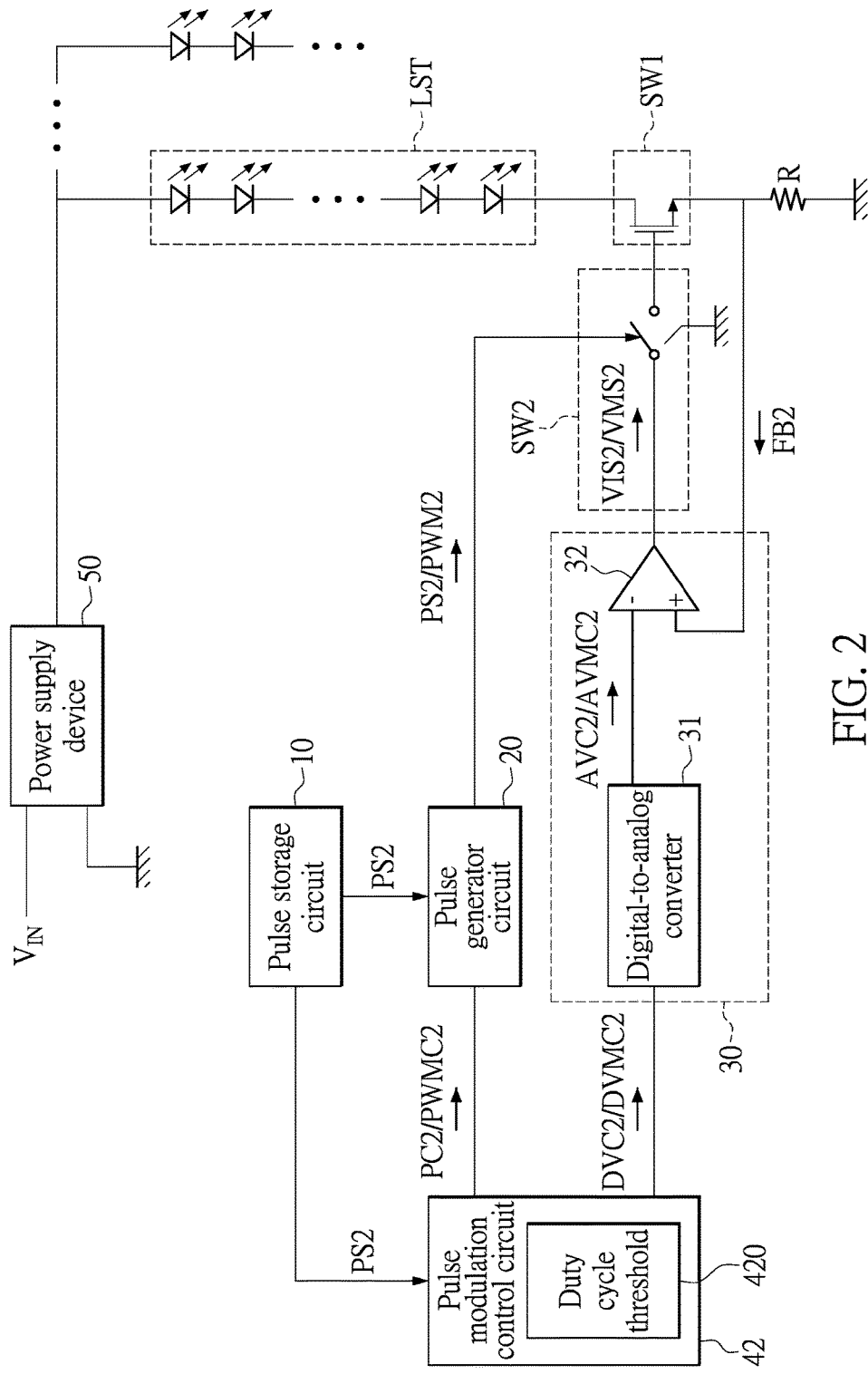
FIG. 2 is a circuit layout diagram of the backlight device in the pulse width modulation mode according to a second embodiment of the present disclosure.

Reference is made to FIG. 2, which is a circuit layout diagram of a backlight device in a pulse width modulation mode according to a second embodiment of the present disclosure. As shown in FIG. 2, in the embodiment, the backlight device includes the light strips LST, the first switch components SW1 and the second switch components SW2. In addition, in the embodiment, the backlight device further includes the pulse storage circuit 10, the pulse generator circuit 20, the voltage adjuster circuit 30, a pulse modulation control circuit 42 and the power supply device 50, which are configured to control operations of the light strips LST and the switch components SW1 and SW2.

The voltage adjuster circuit 30 may include one or more digital-to-analog converters 31 and operational amplifiers 32. The operational amplifiers 32 are configured to control the light strips LST to emit light respectively. The common digital-to-analog converter 31 may be configured for the light strips LST. Alternatively, the digital-to-analog converters 31 may be configured for the light strips LST respectively. It should be understood that circuit configurations and operations of the digital-to-analog converters 31 and the operational amplifiers 32 described in the embodiment may also be applied in the first embodiment.

The digital-to-analog converter 31 is connected to the pulse modulation control circuit 42. One terminal such as an inverting terminal of the operational amplifier 32 is connected to an output terminal of the digital-to-analog converter 31. Another terminal such as a non-inverting terminal of the operational amplifier 32 is connected to a node between the second terminal of the first switch components SW1 and one terminal of the resistor R. An output terminal of the operational amplifier 32 may be connected to the first switch component SW1 through the second switch component SW2.

First, the pulse storage circuit 10 stores a preset initial pulse signal PS2. The pulse generator circuit 20 obtains and stores a duty cycle threshold 420. The pulse modulation control circuit 42 obtains the initial pulse signal PS2 from the pulse storage circuit 10. In a pulse width modulation mode, when the backlight device intends to display a low grayscale image, the pulse modulation control circuit 42 calculates a duty cycle of the initial pulse signal PS2 and compares the duty cycle of the initial pulse signal PS2 with the duty cycle threshold 420.

When the pulse modulation control circuit 42 determines that the duty cycle of the initial pulse signal PS2 is larger than the duty cycle threshold 420, the pulse modulation control circuit 42 outputs a pulse control signal PC2 to the pulse generator circuit 20 to control the pulse generator circuit 20 to output the initial pulse signal PS2. At the same time, the pulse modulation control circuit 42 outputs a digital voltage adjusting control signal DVMC2 to the digital-to-analog converter 31 of the voltage adjuster circuit 30. The digital-to-analog converter 31 may convert the digital voltage adjusting control signal DVMC2 into an analog voltage adjusting control signal AVMC2 to be outputted to the operational amplifier 32.

The one terminal such as the inverting terminal of the operational amplifier 32 receives the analog voltage adjusting control signal AVMC2 from the digital-to-analog converter 31. The another terminal such as the non-inverting terminal of the operational amplifier 32 receives a feedback signal FB2 that is a node voltage at a node between the second terminal of the first switch component SW1 and the one terminal of the resistor R.

The operational amplifier 32 compares the analog voltage adjusting control signal AVMC2 from the digital-to-analog converter 31 with the feedback signal FB2 from the first switch component SW1 to generate an initial voltage signal VIS2 to be outputted to the first switch component SW1 to control the first switch component SW1 to operate, thereby adjusting a current flowing through each of the light strips such that the backlight device displays the image at desired brightness.

It is worth noting that, conversely, when the pulse modulation control circuit 42 determines that the duty cycle of the initial pulse signal PS2 is smaller than the duty cycle threshold 420, the pulse modulation control circuit 42 determines that the first switch component SW1 and other switch components of the backlight device cannot be turned on by the initial pulse signal PS2.

Under this circumstance, the pulse modulation control circuit 42 outputs a pulse width modulation control signal PWMC2 to the pulse generator circuit 20 and the digital voltage adjusting control signal DVMC2 to the voltage adjuster circuit 30, according to a ratio of the duty cycle to the duty cycle threshold 420.

The pulse generator circuit 20 adjusts a pulse width of the initial pulse signal PS2 to output a pulse width modulation signal PWM2 having a duty cycle that is larger than the duty cycle threshold 420, according to the pulse width modulation control signal PWMC2 from the pulse modulation control circuit 42.

The digital-to-analog converter 31 may receive the digital voltage adjusting control signal DVMC2 from the pulse modulation control circuit 42. The digital-to-analog converter 31 may convert the digital voltage adjusting control signal DVMC2 into an analog voltage adjusting control signal AVMC2 to be outputted to the operational amplifier 32.

The one terminal such as the inverting terminal of the operational amplifier 32 receives the analog voltage adjusting control signal AVMC2 from the digital-to-analog converter 31. The another terminal such as the non-inverting terminal of the operational amplifier 32 receives the feedback signal FB2 that is the node voltage at the node between the second terminal of the first switch component SW1 and the one terminal of the resistor R.

The operational amplifier 32 compares the analog voltage adjusting control signal AVMC2 with the feedback signal FB2 to generate a voltage adjusting signal VMS2 to be outputted to the first switch component SW1. For example, when the node voltage of the feedback signal FB2 is not equal to, for example, is larger than, the analog voltage adjusting control signal AVMC2, the operational amplifier 32 may output the voltage adjusting signal VMS2 to the first switch component SW1 to control the first switch component SW1 to operate so as to adjust a current flowing through the light strip LST. The analog voltage adjusting control signal AVMC2 may be a voltage signal or a current signal for enabling the backlight device to display the low grayscale images.

It is worth noting that the operational amplifier 32 outputs the analog voltage adjusting control signal AVMC2 for reducing a voltage across the first control terminal of the first switch component SW1 and the second terminal of the first switch component SW1, based on a ratio that is the same as an adjustment ratio of the initial pulse signal PS2 to the pulse width modulation signal PWM2. As a result, the backlight device can display an image having a lower grayscale linearity.

Figure 3:
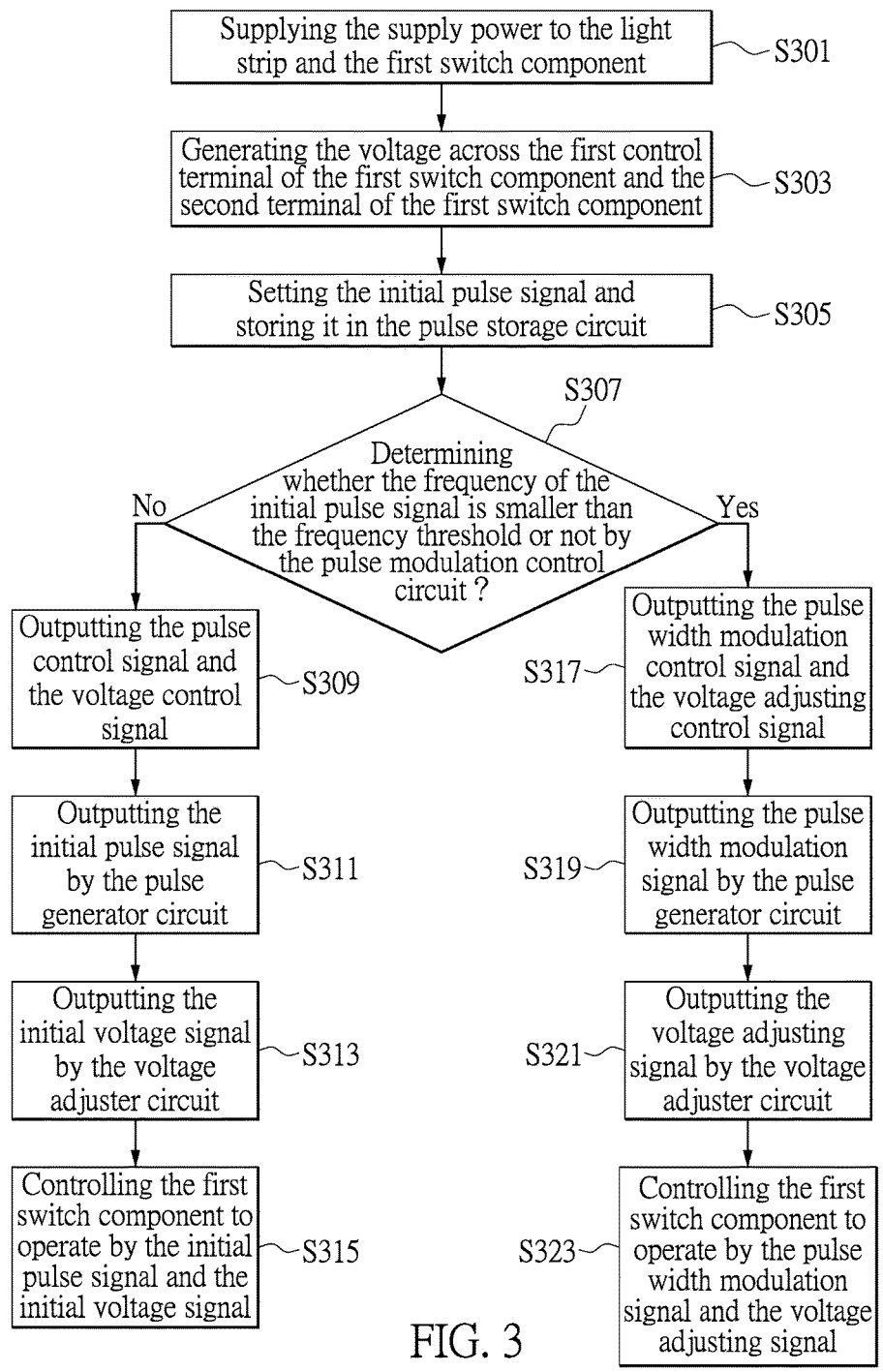
FIG. 3 is a flowchart diagram of a dimming control method for the backlight device according to a third embodiment of the present disclosure.

Reference is made to FIG. 3, which is a flowchart diagram of a dimming control method for a backlight device according to a third embodiment of the present disclosure. As shown in FIG. 3, in the embodiment, the dimming control method for the backlight device includes the following steps S301 to S323.

In step S301, the power supply device supplies the power to the light strips and the first switch components, wherein the light strips are connected to the power supply device and the first switch components.

In step S303, the voltage across the first control terminal of the first switch component and the second terminal of the first switch component is generated.

In step S305, the pulse storage circuit stores the preset initial pulse signal.

In step S307, the pulse modulation control circuit determines whether the frequency of the initial pulse signal is smaller than the frequency threshold. If the frequency of the initial pulse signal is not smaller than the frequency threshold, steps S309 to S315 are performed sequentially. If the frequency of the initial pulse signal is smaller than the frequency threshold, steps S317 to S323 are performed sequentially.

In step S309, the pulse modulation control circuit outputs the pulse control signal to the pulse generator circuit and the voltage control signal to the voltage adjuster circuit.

In step S311, the pulse generator circuit outputs the initial pulse signal of the pulse storage circuit to the first switch component, according to the pulse control signal from the pulse modulation control circuit.

In step S313, the voltage adjuster circuit outputs the initial voltage signal to the first switch component, according to the voltage control signal from the pulse modulation control circuit.

In step S315, the first switch component is controlled by the initial pulse signal from the pulse generator circuit and the initial voltage signal from the voltage adjuster circuit so as to control the brightness of the light strips such that the backlight device can display the image at the desired brightness.

In step S317, the pulse modulation control circuit outputs the pulse width modulation control signal to the pulse generator circuit and the voltage adjusting control signal to the voltage adjuster circuit.

In step S319, the pulse generator circuit adjusts the pulse width of the initial pulse signal to output the pulse width modulation signal to the first switch component, according to the pulse width modulation control signal from the pulse modulation control circuit.

In step S321, the voltage adjuster circuit outputs the voltage adjusting signal to the first switch component according to the voltage adjusting control signal from the pulse modulation control circuit.

In step S323, the first switch component is controlled by the pulse width modulation signal from the pulse generator circuit and the voltage adjusting signal from the voltage adjuster circuit, so as to control the backlight device to display the image at a brightness that is substantially the same as that of the backlight device in step S315. In this case, the circuit components of the backlight device does not generate any noise.

Figure 4:
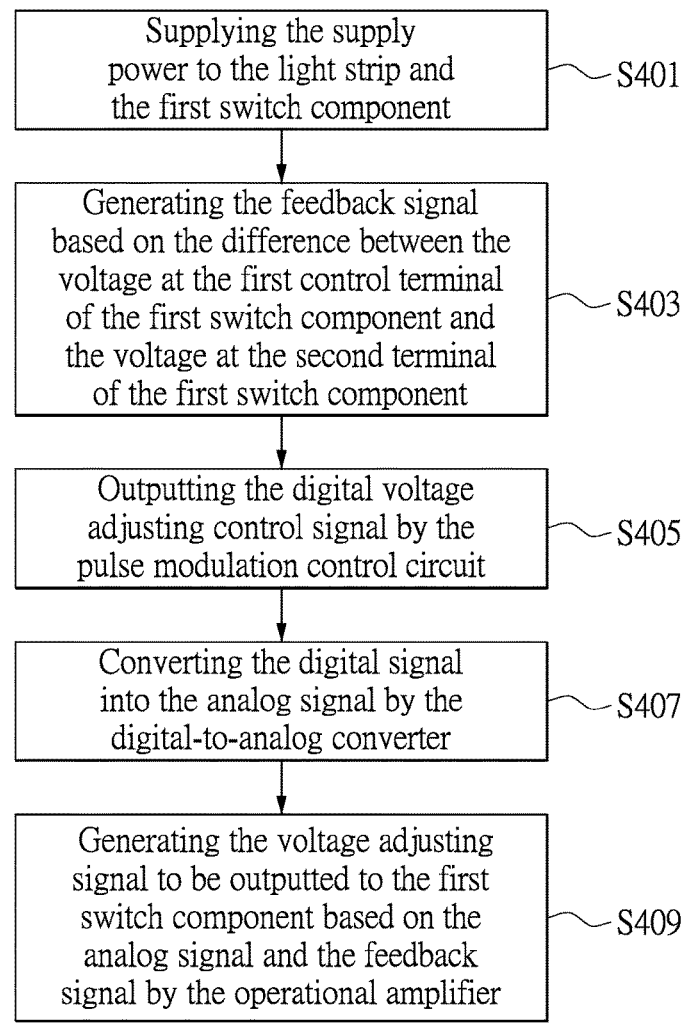
FIG. 4 is a flowchart diagram of the dimming control method for the backlight device according to a fourth embodiment of the present disclosure.

Reference is made to FIG. 4, which is a flowchart diagram of a dimming control method for a backlight device according to a fourth embodiment of the present disclosure. As shown in FIG. 4, in the embodiment, the dimming control method for the backlight device includes the following steps S401 to S409, which are further exemplified for the operations of the voltage adjuster circuit of the third embodiment.

In step S401, the power supply device supplies the power to the light strips and the first switch components. The power supply device is connected to the positive terminals of the light strips. The first switch components are connected to the negative terminals of the light strips respectively.

In step S403, the feedback signal is generated based on a voltage difference between the voltage at the first control terminal of the first switch component and the voltage at the second terminal of the first switch component and outputted to the digital-to-analog converter.

In step S405, the pulse modulation control circuit outputs the digital voltage modulation control signal to the digital-to-analog converter.

In step S407, the digital-to-analog converter of the voltage adjuster circuit converts the digital voltage modulation control signal from the pulse modulation control circuit into the analog voltage modulation control signal to be outputted to the operational amplifier.

In step S409, the operational amplifier of the voltage adjuster circuit compares the analog voltage modulation control signal from the digital-to-analog converter with the feedback signal from the first switch component to generate the voltage adjusting signal to be outputted to the first switch component.

Figure 5:
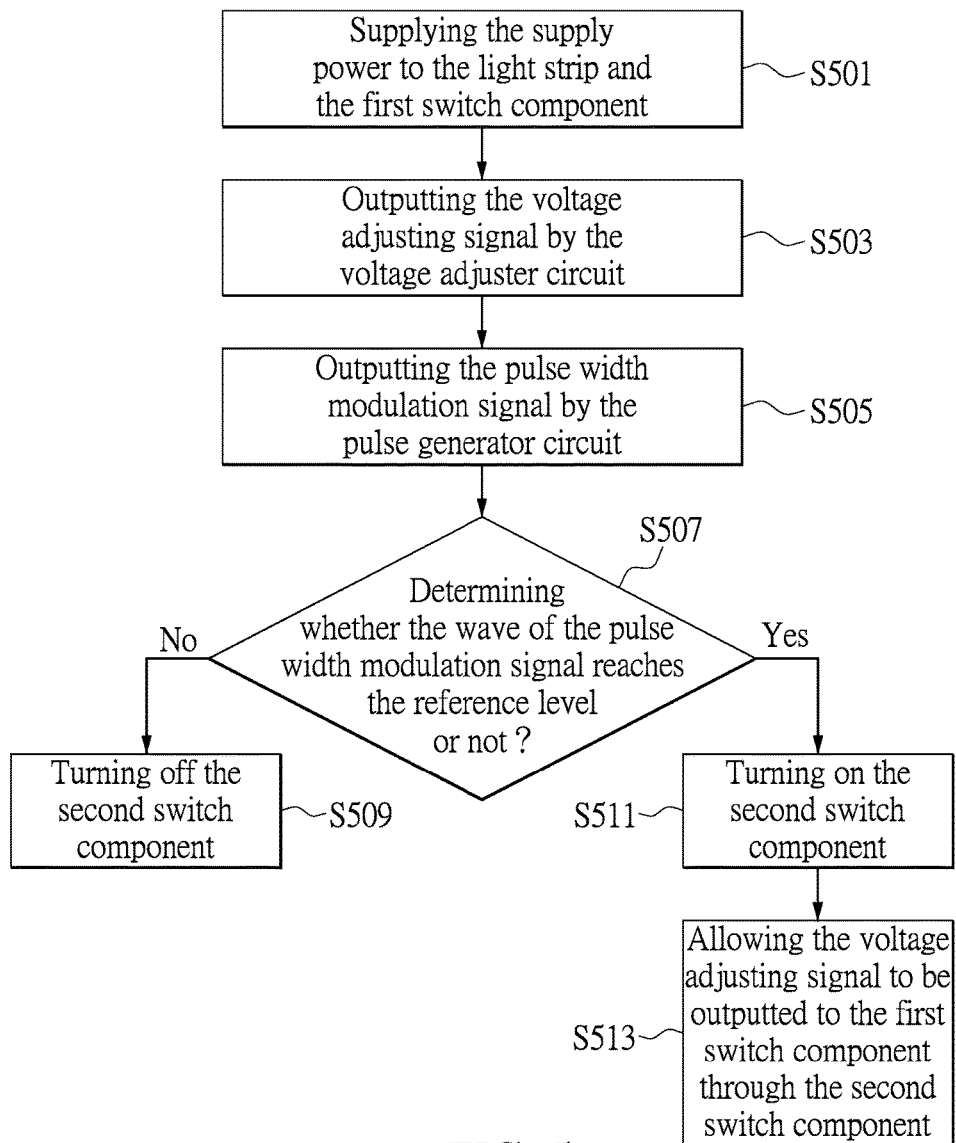
FIG. 5 is a flowchart diagram of the dimming control method for the backlight device according to a fifth embodiment of the present disclosure.

Reference is made to FIG. 5, which is a flowchart diagram of a dimming control method for a backlight device according to a fifth embodiment of the present disclosure. As shown in FIG. 5, in the embodiment, the dimming control method for the backlight device includes the following steps S501 to S513.

In step S501, the power supply device supplies the power to the light strips and the first switch components. The light strips are connected to the power supply device and the first switch components.

In step S503, the voltage adjuster circuit outputs the voltage adjusting signal to the second switch component.

In step S505, the pulse generator circuit outputs the pulse width modulation signal to the second switch component.

In step S507, when the wave of the pulse width modulation signal received by the second switch component reaches the reference level, step S509 is performed. Conversely, when the wave of the pulse width modulation signal received by the second switch component does not reach the reference level, steps S511 and S513 are performed sequentially.

In step S509, the second switch component is turned off by the pulse width modulation signal. For example, in this situation, the fourth terminal of the second switch component may be grounded.

In step S511, the second switch component is turned on by the pulse width modulation signal. For example, in this situation, the fourth terminal of the second switch component may be connected to the first control terminal of the first switch component.

In step S513, the pulse width modulation signal and the voltage adjusting signal are allowed to be transmitted to the first switch component through the second switch component.

Figure 6:
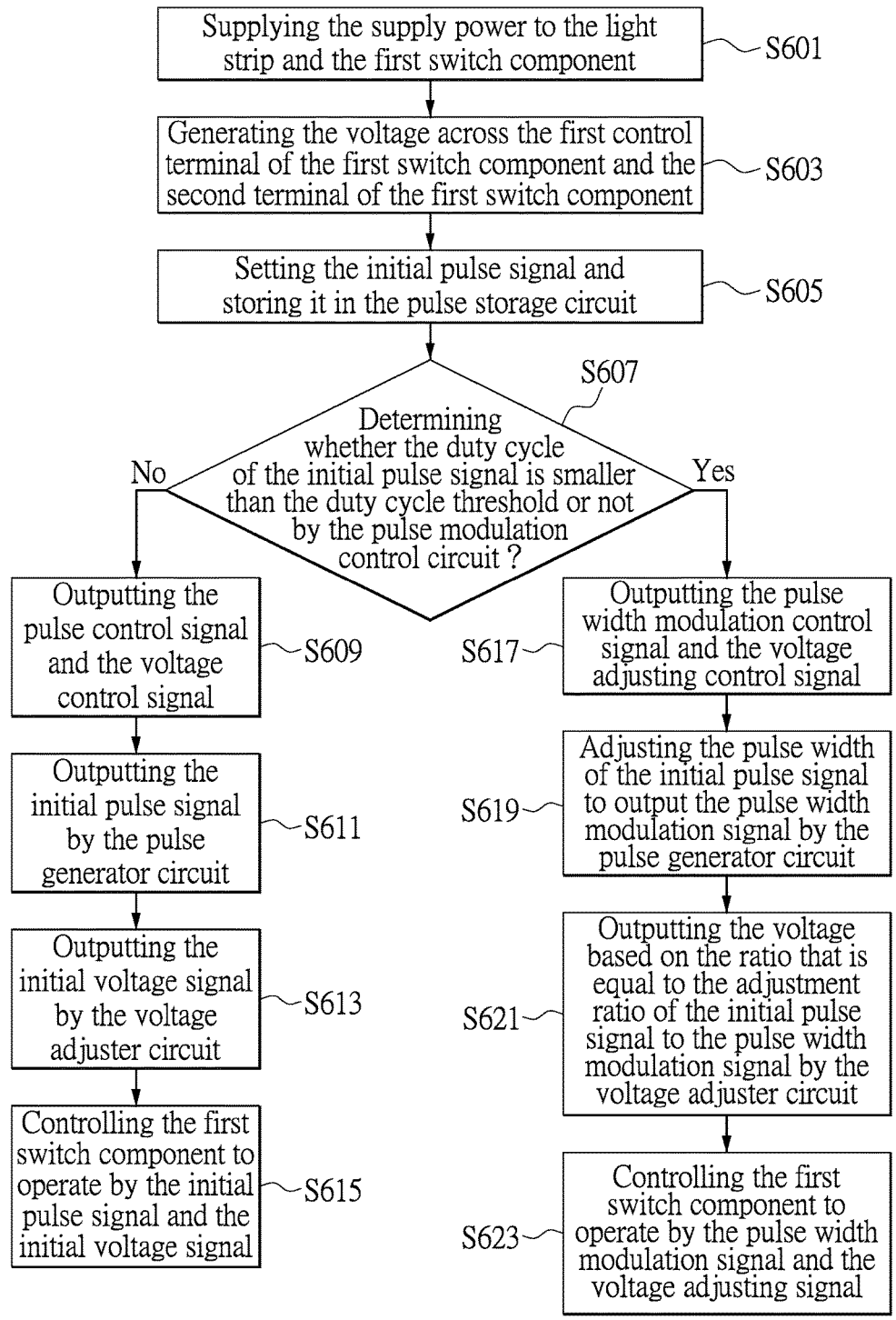
FIG. 6 is a flowchart diagram of the dimming control method for the backlight device according to a sixth embodiment of the present disclosure.

Reference is made to FIG. 6, which is a flowchart diagram of a dimming control method for a backlight device according to a sixth embodiment of the present disclosure. As shown in FIG. 6, in the embodiment, the dimming control method for the backlight device includes the following steps S601 to S623.

In step S601, the power supply device supplies the power to the light strips and the first switch components. The light strips are connected to the power supply device and the first switch components.

In step S603, the voltage is generated based on the voltage difference between the voltage at the first control terminal of the first switch component and the voltage at the second terminal of the first switch component In step S605, the pulse storage circuit stores the preset initial pulse signal.

In step S607, the pulse modulation control circuit determines whether the duty cycle of the initial pulse signal is smaller than the duty cycle threshold in the pulse frequency modulation mode. If the initial pulse signal is not smaller than the duty cycle threshold, steps S609 to S615 are performed sequentially. If the initial pulse signal is smaller than the duty cycle threshold, steps S617 to S623 are performed sequentially.

In step S609, the pulse modulation control circuit outputs the pulse control signal to the pulse generator circuit and the voltage control signal to the voltage adjuster circuit.

In step S611, the pulse generator circuit outputs the initial pulse signal of the pulse storage circuit to the first switch component, according to the pulse control signal from the pulse modulation control circuit.

In step S613, the voltage adjuster circuit outputs the initial voltage signal to the first switch component, according to the voltage control signal from the pulse modulation control circuit.

In step S615, the first switch component is controlled by the initial pulse signal from the pulse generator circuit and the initial voltage signal from the voltage adjuster circuit so as to control the light strips to emit light at the desired brightness such that the backlight device can display the image at the desired brightness.

In step S617, the pulse modulation control circuit outputs the pulse width modulation control signal to the pulse generator circuit and the voltage adjusting control signal to the voltage adjuster circuit.

In step S619, the pulse generator circuit adjusts the pulse width of the initial pulse signal to output the pulse width modulation signal to the first switch component, according to the pulse width modulation control signal from the pulse modulation control circuit.

In step S621, the voltage adjuster circuit outputs the voltage adjusting signal to the first switch component according to the voltage adjusting control signal from the pulse modulation control circuit.

In step S623, the first switch component is controlled by the pulse modulation signal from the pulse generator circuit and the voltage adjusting signal from the voltage adjuster circuit such that the backlight device can display the lower grayscale image.

In summary, the present disclosure provides the backlight device and the dimming control method thereof, which can prevent the pulse signal from having too low a frequency in the backlight device. Therefore, the internal circuit components of the backlight device do not generate noise when the backlight device displays the images. In addition, the backlight device can display the images having the lower grayscale than that of a conventional backlight device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A backlight device, comprising:
    a plurality of light strips connected in parallel with each other and configured to receive supplied power, wherein each of the light strips includes one or more light-emitting components connected in series with each other;
    a plurality of first switch components each of which has a first terminal, a second terminal and a first control terminal and configured to receive the supplied power, wherein the first control terminals of the first switch components are connected to the light strips respectively, and the second terminal of each of the first switch components is grounded through a resistor;
    a pulse storage circuit configured to store an initial pulse signal;
    a pulse generator circuit connected to the first control terminals of the first switch components and configured to output a pulse width modulation signal to each of the first switch components;
    a voltage adjuster circuit connected to the first control terminals of the first switch components and configured to output a voltage adjusting signal to each of the first switch components; and
    a pulse modulation control circuit connected to the pulse storage circuit, the pulse generator circuit and the voltage adjuster circuit, wherein when the pulse modulation control circuit determines that a frequency of the initial pulse signal is smaller than a frequency threshold in a pulse frequency modulation mode, the pulse modulation control circuit outputs a pulse width modulation control signal for controlling the pulse generator circuit to increase a pulse width of the initial pulse signal to output the pulse width modulation signal having a frequency that is larger than the frequency threshold based on a ratio of the frequency of the initial pulse signal to the frequency threshold, and the pulse modulation control circuit outputs a voltage adjusting control signal to control the voltage adjuster circuit to output the voltage adjusting signal for reducing a voltage across the first control terminal and the second terminal of each of the first switch components based on a ratio that is the same as an adjustment ratio of the initial pulse signal to the pulse width modulation signal.

2. The backlight device of claim 1, wherein when the pulse modulation control circuit determines that the frequency of the initial pulse signal is larger than the frequency threshold in the pulse frequency modulation mode, the pulse modulation control circuit outputs a pulse control signal for controlling the pulse generator circuit to output the initial pulse signal to each of the first switch components, and outputs a voltage control signal for controlling the voltage adjuster circuit to output an initial voltage signal to each of the first switch components.

3. The backlight device of claim 1, wherein when the pulse modulation control circuit determines that a duty cycle of the initial pulse signal is smaller than a duty cycle threshold in a pulse width modulation mode, the pulse modulation control circuit outputs the pulse width modulation control signal for controlling the pulse generator circuit to increase the pulse width of the initial pulse signal to output the pulse width modulation signal having the duty cycle that is larger than the duty cycle threshold based on a ratio of the duty cycle of the initial pulse signal to the duty cycle threshold, and the pulse modulation control circuit outputs the voltage adjusting control signal for controlling the voltage adjuster circuit to output the voltage adjusting signal for reducing the voltage across the first control terminal and the second terminal of each of the first switch components based on the ratio that is the same as the adjustment ratio of the initial pulse signal to the pulse width modulation signal.

4. The backlight device of claim 3, wherein when the pulse modulation control circuit determines that the duty cycle of the initial pulse signal is larger than the duty cycle threshold in the pulse width modulation mode, the pulse modulation control circuit outputs the pulse control signal for controlling the pulse generator circuit to output the initial pulse signal and output the voltage control signal for controlling the voltage adjuster circuit to output an initial voltage signal.

5. The backlight device of claim 1, wherein the voltage adjuster circuit includes a digital-to-analog converter connected to the pulse modulation control circuit and the first terminals of the first switch components;
    when the frequency of the initial pulse signal is smaller than the duty cycle threshold, the digital-to-analog converter receives a digital voltage adjusting control signal from the pulse modulation control circuit and converts the digital voltage adjusting control signal into an analog voltage adjusting control signal to be outputted to the first control terminal of each of the first switch components.

6. The backlight device of claim 5, wherein the voltage adjuster circuit further includes a plurality of operational amplifiers each having one input terminal connected to the digital-to-analog converter to receive the analog voltage adjusting control signal from the digital-to-analog converter, and another input terminal connected to a node between the second terminal of each of the first switch components and each of the resistors to receive a feedback signal through the node;
each of the operational amplifiers compares the analog voltage adjusting control signal with the feedback signal to output the voltage adjusting signal to each of the first switch components.

7. The backlight device of claim 6, further comprising: a plurality of second switch components each having a third terminal, a fourth terminal and a second control terminal, wherein the third terminal of each of the second switch components is connected to an output terminal of the operational amplifier to receive the analog voltage adjusting control signal, the second control terminal of each of the second switch components is connected to an output terminal of the pulse generator circuit to receive the pulse width modulation control signal;
wherein when a level of a wave of the pulse width modulation control signal does not reach a reference level, the fourth terminal of each of the second switch components is grounded;
wherein when a level of a wave of the pulse width modulation control signal reaches the reference level, the fourth terminal of each of the second switch components is connected to the first control terminal of each of the first switch components to allow the pulse width modulation signal and the voltage adjusting signal to be outputted to each of the first switch components through each of the second switch components.

8. A dimming control method for a backlight device, comprising the following steps:
supplying power to light strips and first switch components by a power supply device;
generating a voltage across a first control terminal of each of first switch components and the second terminal of each of the first switch components;
setting an initial pulse signal and storing the initial pulse signal in a pulse storage circuit;
determining whether a frequency of the initial pulse signal is smaller than a frequency threshold or not in a pulse frequency modulation mode by a pulse modulation control circuit, in response to the initial pulse signal being not smaller than the frequency threshold, outputting a pulse control signal and a voltage control signal, in response to the initial pulse signal being smaller than the frequency threshold, outputting a pulse width modulation control signal and a voltage adjusting control signal based on a ratio of the frequency of the initial pulse signal to the frequency threshold;
outputting, by a pulse generator circuit, the initial pulse signal of the pulse storage circuit according to the received pulse control signal, or increasing a pulse width of the initial pulse signal according to the received pulse width modulation control signal to output a pulse width modulation signal having a frequency that is larger than the frequency threshold;
outputting, by a voltage adjuster circuit, an initial voltage signal according to the received voltage control signal, or outputting a voltage adjusting signal for reducing a voltage across the first control terminal and the second terminal of each of the first switch components based on a ratio that is the same as an adjustment ratio of the initial pulse signal to the pulse width modulation signal; and
controlling each of the first switch components to operate by the initial pulse signal and the voltage control signal which are outputted to each of the first switch components, or controlling each of the first switch components to operate by the pulse width modulation signal and the voltage adjusting control signal which are outputted to each of the first switch components.

9. The dimming control method of claim 8, further comprising a step of:
determining whether a duty cycle of the initial pulse signal is smaller than a duty cycle threshold or not in a pulse width modulation mode by the pulse modulation control circuit,
in response to the initial pulse signal being not smaller than the duty cycle threshold, outputting the pulse control signal for controlling the pulse generator circuit to output the initial pulse signal and outputting the voltage control signal for controlling the voltage adjuster circuit to output the initial voltage signal,
in response to the initial pulse signal being smaller than the duty cycle threshold, outputting the pulse width modulation control signal for controlling the pulse generator circuit to increase the pulse width of the initial pulse signal to output the pulse width modulation signal having the duty cycle that is larger than the duty cycle threshold based on a ratio of the duty cycle of the initial pulse signal to the duty cycle threshold, and outputting the voltage adjusting control signal for controlling the voltage adjuster circuit to output the voltage adjusting signal for reducing the voltage across the first control terminal and the second terminal of each of the first switch components based on the ratio that is the same as the adjustment ratio of the initial pulse signal to the pulse width modulation signal.

10. The dimming control method of claim 8, further comprising steps of:
receiving a digital voltage adjusting control signal by a digital-to-analog converter; and
converting the digital voltage adjusting control signal into an analog voltage adjusting control signal to be outputted to the first control terminal of each of the first switch components by the digital-to-analog converter.

11. The dimming control method of claim 10, further comprising steps of:
receiving the analog voltage adjusting control signal by one input terminal of each of a plurality of operational amplifiers from an output terminal of the digital-to-analog converter, and receiving a feedback signal from a node between the second terminal of each of the first switch components and one terminal of each of the resistors by another input terminal of each of the operational amplifiers; and
generating the voltage adjusting signal to be outputted to each of the first switch components based on the analog voltage adjusting control signal and the feedback signal by each of the operational amplifiers.

12. The dimming control method of claim 11, further comprising steps of:
- outputting the analog voltage adjusting control signal to a third terminal of each of a plurality of second switch components from an output terminal of each of the operational amplifiers which are connected to the third terminals of the second switch components respectively;
- outputting the pulse width modulation control signal to a second control terminal of each of the second switch components from an output terminal of the pulse generator circuit connected to the second control terminal of each of the second switch components;
- when a level of a wave of the pulse width modulation control signal does not reach a reference level, controlling a fourth terminal of each of the second switch components to be grounded by the pulse width modulation control signal; and
- when a level of a wave of the pulse width modulation control signal reaches the reference level, controlling the fourth terminal of each of the second switch components to be connected to the first control terminal of each of the first switch components by the pulse width modulation control signal to allow the pulse width modulation signal and the voltage adjusting signal to be outputted to each of the first switch components through each of the second switch components.

* * * * *